US009803697B2

(12) United States Patent
Witherspoon et al.

(10) Patent No.: US 9,803,697 B2
(45) Date of Patent: Oct. 31, 2017

(54) COUPLING FOR SUPERCHARGER (71) Applicant: Eaton Corporation, Cleveland, OH (US)

(72) Inventors: William Bruce Witherspoon, Lansing, MI (US); Thomas Walsh, Marshall, MI (US); TouXia Kue, Marshall, MI (US); Timothy Kish, Kalamazoo, MI (US); John Scott Pierce, Battle Creek, MI (US); Kenneth Arthur Rienas, Howell, MI (US)

(73) Assignee: Eaton Corporation, Cleveland, OH (US)

( * ) Notice: Subject to any disclaimer, the term of this patent is extended or adjusted under 35 U.S.C. 154(b) by 131 days.

(21) Appl. No.: 14/883,906

(22) Filed: Oct. 15, 2015

(65) Prior Publication Data
US 2016/0032985 A1    Feb. 4, 2016

Related U.S. Application Data

(63) Continuation of application No. PCT/US2014/033446, filed on Apr. 9, 2014.
(Continued)

(51) Int. Cl.
*F16D 3/70* (2006.01)
*F02B 39/04* (2006.01)
(Continued)

(52) U.S. Cl.
CPC .............. *F16D 3/70* (2013.01); *F02B 39/04* (2013.01); *F02B 39/12* (2013.01); *F16D 3/68* (2013.01); *F16D 3/78* (2013.01)

(58) Field of Classification Search
CPC .. F02B 39/04; F02B 39/12; F16D 3/68; F16D 3/70; F16D 3/78
(Continued)

(56) References Cited

U.S. PATENT DOCUMENTS 2,565,606 A * 8/1951 Guy .......................... F16D 3/70
464/72 X
2,727,369 A * 12/1955 Fawick .................... F16D 3/50
464/72 X
(Continued)

FOREIGN PATENT DOCUMENTS

DE          664 478      *   8/1938
SU           740991 A        6/1980
SU          1123554 A        7/1984

OTHER PUBLICATIONS

International Search Report for International Application No. PCT/US2014/033446 mailed Aug. 28, 2014, 2 pages.

*Primary Examiner* — Gregory Binda
(74) *Attorney, Agent, or Firm* — RMCK Law Group, PLC (57) ABSTRACT

A coupling assembly arranged between an input shaft and a rotor shaft of a supercharger can include a first coupling, a second coupling, a central hub and a plurality of coupler pins. The first coupling can be mounted for concurrent rotation with the input shaft. The second coupling can be mounted for concurrent rotation with the rotor shaft. The central hub can be disposed intermediate the first and second couplings. The central hub defines central hub bores therein. A plurality of coupler pins can be received in the central hub bores. A first plurality of elastomeric inserts can receive first portions of the plurality of coupler pins. A second plurality of elastomeric inserts can receive second portions of the plurality of coupler pins. The first and second elastomeric inserts can provide dampening between (i) the first coupling and the central hub and (ii) the second coupling and the central hub.

16 Claims, 7 Drawing Sheets

Related U.S. Application Data (60) Provisional application No. 61/812,992, filed on Apr. 17, 2013, provisional application No. 61/860,565, filed on Jul. 31, 2013, provisional application No. 61/843,340, filed on Jul. 6, 2013, provisional application No. 61/843,036, filed on Jul. 4, 2013, provisional application No. 61/938,392, filed on Feb. 11, 2014.

(51) Int. Cl.
*F16D 3/68* (2006.01)
*F16D 3/78* (2006.01)
*F02B 39/12* (2006.01)

(58) Field of Classification Search
USPC .................................................... 464/71, 72
See application file for complete search history.

(56) References Cited

U.S. PATENT DOCUMENTS

| | | | |
|---|---|---|---|
| 2,879,650 A | | 3/1959 | Martin |
| D781,345 S | * | 3/2017 | Pratley |
| 2016/0356318 A1 | * | 12/2016 | Pratley .................... F02B 33/38 |

* cited by examiner

COUPLING FOR SUPERCHARGER

CROSS-REFERENCE TO RELATED APPLICATION

This application is a continuation of International Patent Application No. PCT/US2014/033446 filed on Apr. 9, 2014, which claims the benefit of U.S. Patent Application No. 61/812,992 filed on Apr. 17, 2013, U.S. Patent Application No. 61/860,565 filed on Jul. 31, 2013, U.S. Patent Application No. 61/843,340 filed on Jul. 6, 2013, U.S. Patent Application No. 61/843,036 filed on Jul. 4, 2013, and U.S. Patent Application No. 61/938,392 filed on Feb. 11, 2014. The disclosures of the above applications are incorporated herein by reference.

FIELD

The present disclosure relates generally to superchargers and more particularly to a coupling between an input shaft and a rotor shaft on a supercharger.

BACKGROUND

Rotary blowers of the type to which the present disclosure relates are referred to as "superchargers" because they effectively super charge the intake of the engine. One supercharger configuration is generally referred to as a Roots-type blower that transfers volumes of air from an inlet port to an outlet port. A Roots-type blower includes a pair of rotors which must be timed in relationship to each other, and therefore, are driven by meshed timing gears which are potentially subject to conditions such as gear rattle and bounce. Typically, a pulley and belt arrangement for a Roots blower supercharger is sized such that, at any given engine speed, the amount of air being transferred into the intake manifold is greater than the instantaneous displacement of the engine, thus increasing the air pressure within the intake manifold and increasing the power density of the engine.

In some examples, superchargers such as the Roots-type blower can create unwanted noise. For example, Roots-type blower noise may be classified as either of two types. The first is solid borne noise caused by rotation of timing gears and rotor shaft bearings subjected to fluctuating loads (the firing pulses of the engine), and the second is fluid borne noise caused by fluid flow characteristics, such as rapid changes in fluid (air) velocity. The present disclosure is primarily directed toward the solid borne noise. More particularly the present disclosure can minimize the "bounce" of the timing gears during times of relatively low speed operation, when the blower rotors are not "under load". In this regard, it is important to isolate the fluctuating input to the supercharger from the timing gears. In other examples it is desirable to account for misalignment and/or runout between the input shaft and rotor shaft.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A coupling assembly arranged between an input shaft and a rotor shaft of a supercharger can include a first coupling, a second coupling, a central hub and a plurality of coupler pins. The first coupling can have a first plurality of openings therein. The first coupling can be mounted for concurrent rotation with the input shaft. The second coupling can have a second plurality of openings therein. The second coupling can be mounted for concurrent rotation with the rotor shaft. The central hub can be disposed intermediate the first and second couplings. The central hub defines central hub bores therein. A plurality of coupler pins can be received in the central hub bores. A first plurality of elastomeric inserts can be received by the first plurality of openings. The first plurality of elastomeric inserts can receive first portions of the plurality of coupler pins. A second plurality of elastomeric inserts can be received by the second plurality of openings. The second plurality of elastomeric inserts can receive second portions of the plurality of coupler pins. The first and second elastomeric inserts can provide dampening between (i) the first coupling and the central hub and (ii) the second coupling and the central hub.

According to additional features, the first plurality of elastomeric inserts can be molded to the first coupling. The second plurality of elastomeric inserts can be molded to the second coupling. The first plurality of openings can be defined by a first series of steps and a second series of steps. The first series of steps can be radially offset from the second series of steps and parallel to each other.

According to other features, the first inserts can each have an arcuately shaped insert body including a first wing portion and a second wing portion. The first wing portion can nest against a step of the first series of steps. The second wing portion can nest against a step of the second series of steps.

In other features the coupling assembly can further include a first hub and a second hub. The first hub can be configured to couple between the input shaft and the first coupling. The first hub can have a first plurality of hub pins extending therefrom. The second hub can be configured to couple between the rotor shaft and the second coupling. The second hub can have a second plurality of hub pins extending therefrom. The central hub can further define arcuate passages formed therein configured to at least partially receive the first hub pins and the second hub pins. Each insert of the first plurality of elastomeric inserts can define a first aperture and a second aperture. The first aperture can receive a coupler pin. The second aperture can receive a hub pin. Each insert of the second plurality of elastomeric inserts can define a first aperture and a second aperture. The first aperture can receive a coupler pin. The second aperture can receive a hub pin.

A coupling assembly arranged between an input shaft and a rotor shaft of a supercharger constructed in accordance to additional features can include a first coupling, a second coupling, and a plurality of coupler pins. The first coupling can have a first plurality of openings therein. The first coupling can be mounted for concurrent rotation with the input shaft. The second coupling can have a second plurality of openings therein. The second coupling can be mounted for concurrent rotation with the rotor shaft. A first plurality of elastomeric inserts can be received by the first plurality of openings. The first plurality of elastomeric inserts can receive first portions of the plurality of coupler pins. A second plurality of elastomeric inserts can be received by the second plurality of openings. The second plurality of elastomeric inserts can receive second portions of the plurality of coupler pins. The first and second elastomeric inserts can provide dampening between (i) the first coupling and the input shaft and (ii) the second coupling and the rotor shaft.

According to other features, the coupling assembly can further include a central hub disposed intermediate the first and second couplings. The central hub can define central hub bores therein that cooperatively receive the plurality of coupler pins. The first plurality of elastomeric inserts can be molded to the first coupling. The second plurality of elastomeric inserts can be molded to the second coupling. The first plurality of openings can be defined by a first series of steps and a second series of steps. The first series of steps can be radially offset from the second series of steps and can be parallel to each other. The first inserts each can have an arcuately shaped insert body including a first wing portion and a second wing portion. The first wing portion can nest against a step of the first series of steps. The second wing portion can nest against a step of the second series of steps.

According to additional features, the coupling assembly can further include a first hub that is configured to couple between the input shaft and the first coupling. The first hub can have a first plurality of hub pins extending therefrom. The second hub can be configured to couple between the rotor shaft and the second coupling. The second hub can have a second plurality of hub pins extending therefrom. The central hub can further define arcuate passages formed therein configured to at least partially receive the first hub pins and the second hub pins. Each insert of the first plurality of elastomeric inserts can define a first aperture and a second aperture. The first aperture can receive a coupler pin. The second aperture can receive a hub pin.

A coupling assembly arranged between an input shaft and a rotor shaft of a supercharger constructed in accordance to another example of the present disclosure can include a first coupling, a second coupling, a central hub and a plurality of coupler pins. The first coupling can be mounted for concurrent rotation with the input shaft. The second coupling can be mounted for concurrent rotation with the rotor shaft. The central hub can be disposed between the first and second couplings. The central hub can define central hub bores therein. The plurality of coupler pins can be received in the central hub bores. A first plurality of elastomeric inserts can be configured on the first coupling. The first plurality of elastomeric inserts can receive first portions of the plurality of coupler pins. A second plurality of elastomeric inserts can be configured on the second coupling. The second plurality of elastomeric inserts can receive second portions of the plurality of coupler pins. The first and second elastomeric inserts can provide dampening between (i) the first coupling and the central hub and (ii) the second coupling and the central hub.

According to additional features the coupling assembly can further include a first hub and a second hub. The first hub can be configured to couple between the input shaft and the first coupling. The first hub can have a first plurality of hub pins extending therefrom. The second hub can be configured to couple between the rotor shaft and the second coupling. The second hub can have a second plurality of hub pins extending therefrom. The central hub can further define arcuate passages formed therein configured to at least partially receive the first hub pins and the second hub pins.

BRIEF DESCRIPTION OF THE DRAWINGS

The present disclosure will become more fully understood from the detailed description and the accompanying drawings, wherein.

DETAILED DESCRIPTION

Figure 1:
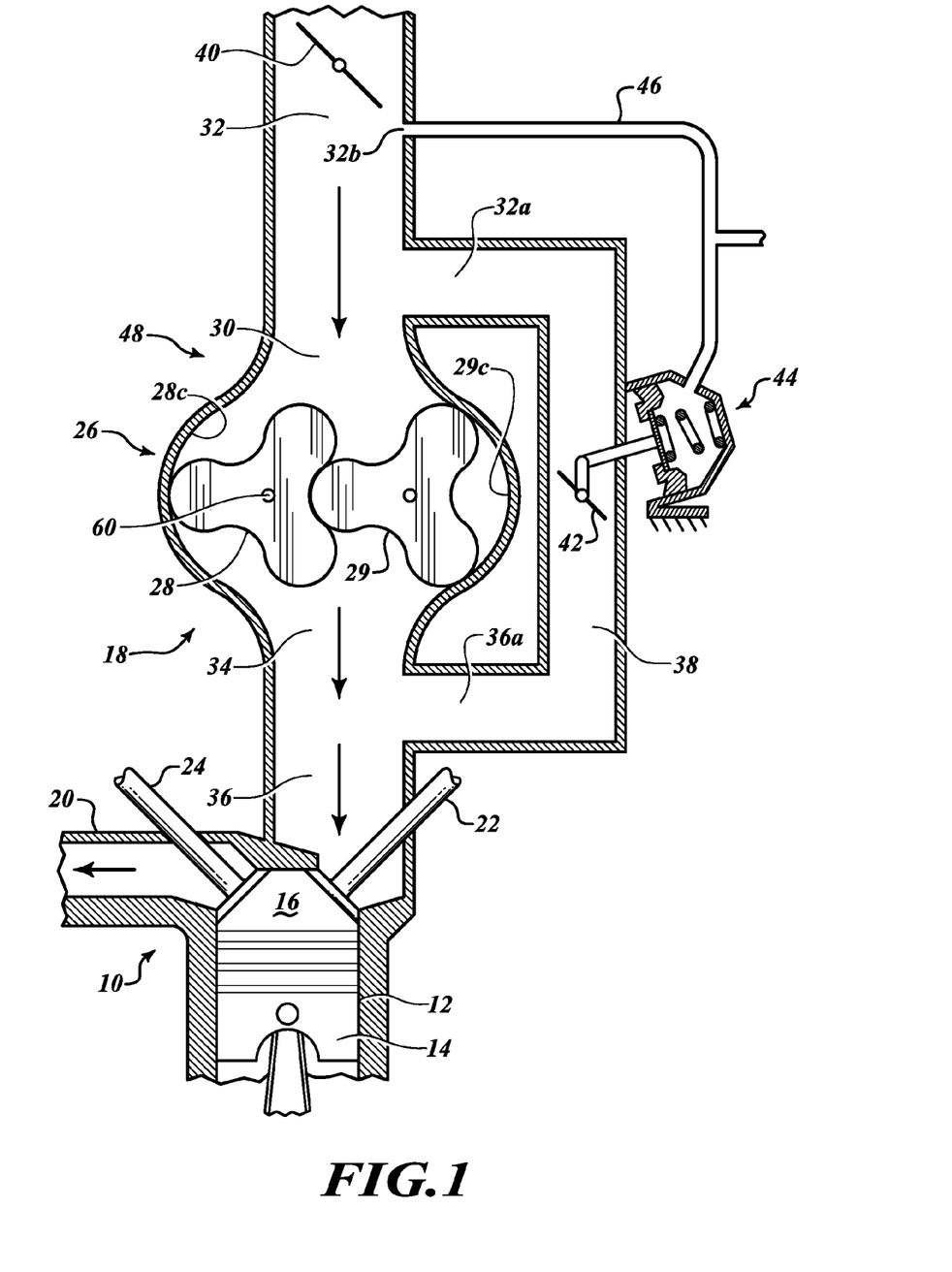
FIG. 1 is a schematic illustration of an intake manifold assembly having a positive displacement blower or supercharger constructed in accordance to one example of the present disclosure.

With initial reference to FIG. 1, a schematic illustration of an exemplary intake manifold assembly, including a Roots blower supercharger and bypass valve arrangement is shown. An engine 10 can include a plurality of cylinders 12, and a reciprocating piston 14 disposed within each cylinder and defining an expandable combustion chamber 16. The engine 10 can include intake and exhaust manifold assemblies 18 and 20, respectively, for directing combustion air to and from the combustion chamber 16, by way of intake and exhaust valves 22 and 24, respectively.

The intake manifold assembly 18 can include a positive displacement rotary blower 26, or supercharger of the Roots type. Further description of the rotary blower 26 may be found in commonly owned U.S. Pat. Nos. 5,078,583 and 5,893,355, which are expressly incorporated herein by reference. The blower 26 includes a pair of rotors 28 and 29, each of which includes a plurality of meshed lobes. The rotors 28 and 29 are disposed in a pair of parallel, transversely overlapping cylindrical chambers 28c and 29c, respectively. The rotors 28 and 29 may be driven mechanically by engine crankshaft torque transmitted thereto in a known manner, such as by a drive belt (not specifically shown). The mechanical drive rotates the blower rotors 28 and 29 at a fixed ratio, relative to crankshaft speed, such that the displacement of the blower 26 is greater than the engine displacement, thereby boosting or supercharging the air flowing to the combustion chambers 16.

The blower 26 can include an inlet port 30 which receives air or air-fuel mixture from an inlet duct or passage 32, and further includes a discharge or outlet port 34, directing the charged air to the intake valves 22 by means of a duct 36. The inlet duct 32 and the discharge duct 36 are interconnected by means of a bypass passage, shown schematically at reference 38. If the engine 10 is of the Otto cycle type, a throttle valve 40 can control air or air-fuel mixture flowing into the intake duct 32 from a source, such as ambient or atmospheric air, in a well know manner. Alternatively, the throttle valve 40 may be disposed downstream of the supercharger 26.

A bypass valve 42 is disposed within the bypass passage 38. The bypass valve 42 can be moved between an open position and a closed position by means of an actuator assembly 44. The actuator assembly 44 can be responsive to fluid pressure in the inlet duct 32 by a vacuum line 46. The actuator assembly 44 is operative to control the supercharging pressure in the discharge duct 36 as a function of engine power demand. When the bypass valve 42 is in the fully open position, air pressure in the duct 36 is relatively low, but when the bypass valve 42 is fully closed, the air pressure in the duct 36 is relatively high. Typically, the actuator assembly 44 controls the position of the bypass valve 42 by means of a suitable linkage. The bypass valve 42 shown and described herein is merely exemplary and other configurations are contemplated. In this regard, a modular (integral) bypass, an electronically operated bypass, or no bypass may be used.

Figure 2:
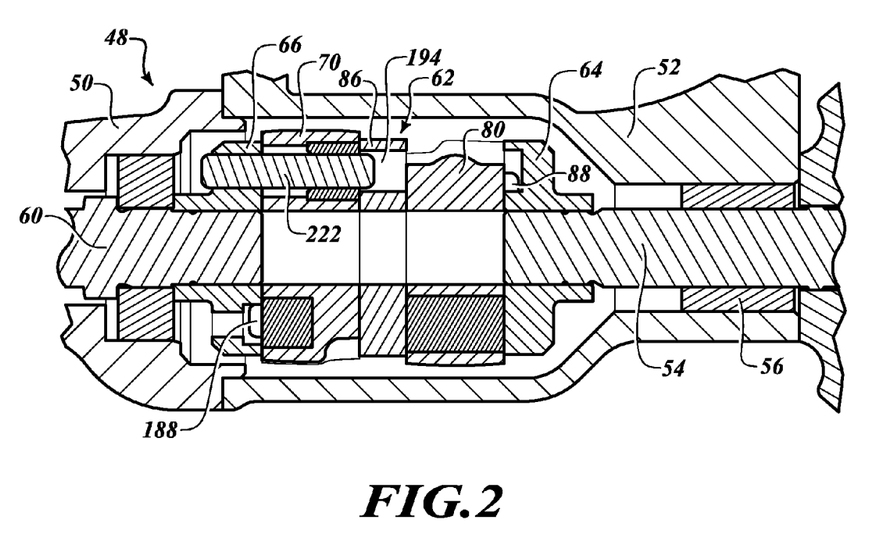
FIG. 2 is an enlarged, fragmentary, axial cross-section of the input section of the supercharger of FIG. 1 and having a coupling assembly used to couple an input shaft and a rotor shaft and constructed in accordance to one example of the present disclosure.
Figure 3:
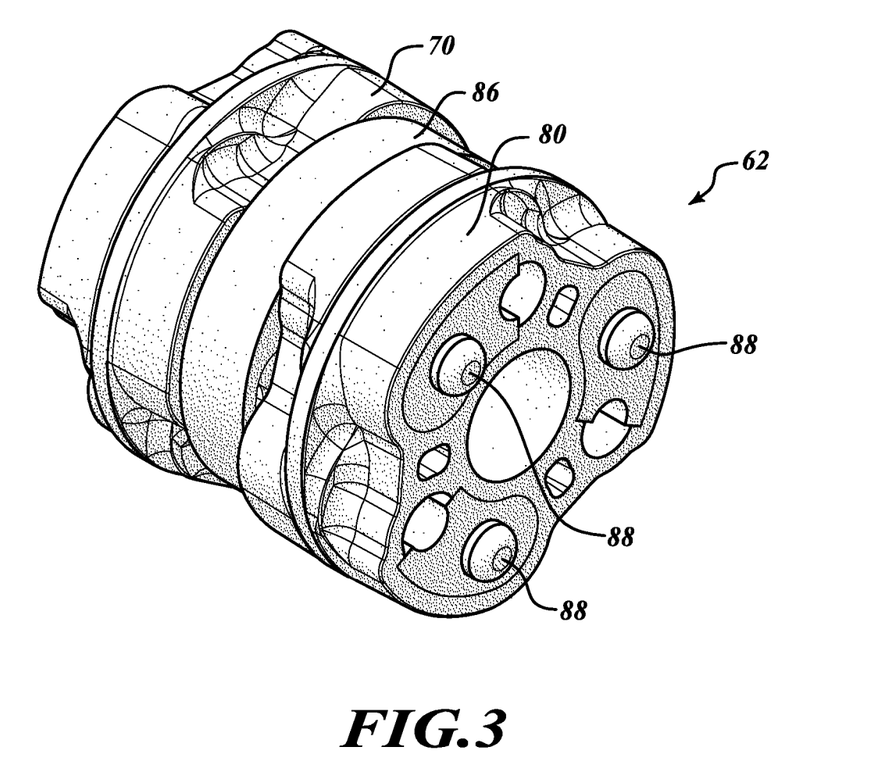
FIG. 3 is front perspective view of the coupling assembly of FIG. 2.

With specific reference now to FIG. 2, an input section 48 of the blower 26 is shown. The input section 48 can include a housing member 50, which forms a forward end of the chambers 28c and 29c. Attached to the housing member 50 is a forward housing 52 within which is disposed an input shaft 54. The input shaft 54 is supported within the forward housing 52 by at least one bearing 56. Rotatably supported by the housing member 50 is a rotor shaft 60 (FIG. 2), upon which is mounted the blower rotor 28 (see FIG. 1). A coupling assembly 62 couples the input shaft 54 to the rotor shaft 60. In one example, a first hub 64 can couple the input shaft 54 to the coupling assembly 62 on a first end and a second hub 66 can couple the rotor shaft 60 to the coupling assembly 62 on an opposite end. While not specifically shown a first timing gear may be mounted on a forward end of the rotor shaft. The first timing gear may define teeth that are in meshed engagement with gear teeth of a second timing gear that is mounted on the second rotor shaft. The second rotor shaft would be in driving engagement with the blower rotor 29.

In one configuration, positive torque is transmitted from an internal combustion engine (of the periodic combustion type) to the input shaft 54 by any suitable drive means, such as a belt and pulley drive system (not shown herein). Torque is transmitted from the input shaft 54 to the rotor shaft 60 through the coupling assembly 62. The coupling assembly 62 of the present disclosure provides torsional and axial damping and can further account for misalignment between the input shaft 54 and the rotor shaft 60. When the engine 10 is driving the timing gears and the blower rotors 28 and 29, such is considered to be transmission of positive torque. On the other hand, whenever the momentum of the rotors 28 and 29 overruns the input from the input shaft 54, such is considered to be the transmission of negative torque.

With additional reference now to FIGS. 3-11, the coupling assembly 62 constructed in accordance to one example of the present disclosure will be described in greater detail. The coupling assembly 62 can generally include a first coupling 70, a second coupling 80, a central hub 86, a plurality of coupler pins 88, a first plurality of inserts 92 and a second plurality of inserts 94. In the example shown, the first and second couplings 70 and 80 are constructed similarly. All of the first and second plurality of inserts 92 and 94 are constructed similarly. All of the coupler pins 88 are also constructed similarly.

Figure 4:
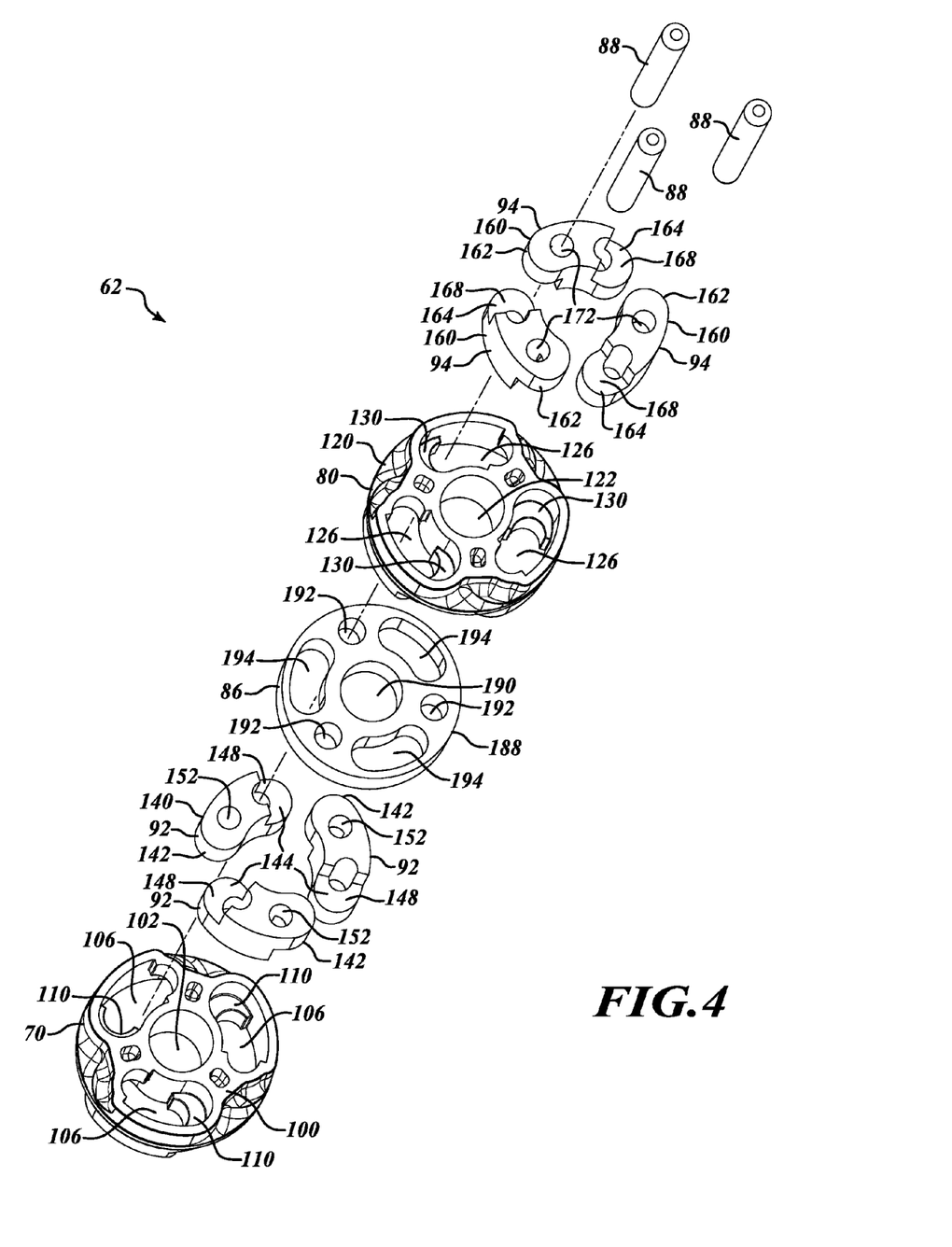
FIG. 4 is a front perspective view of the coupling assembly of FIG. 3.
Figure 5:
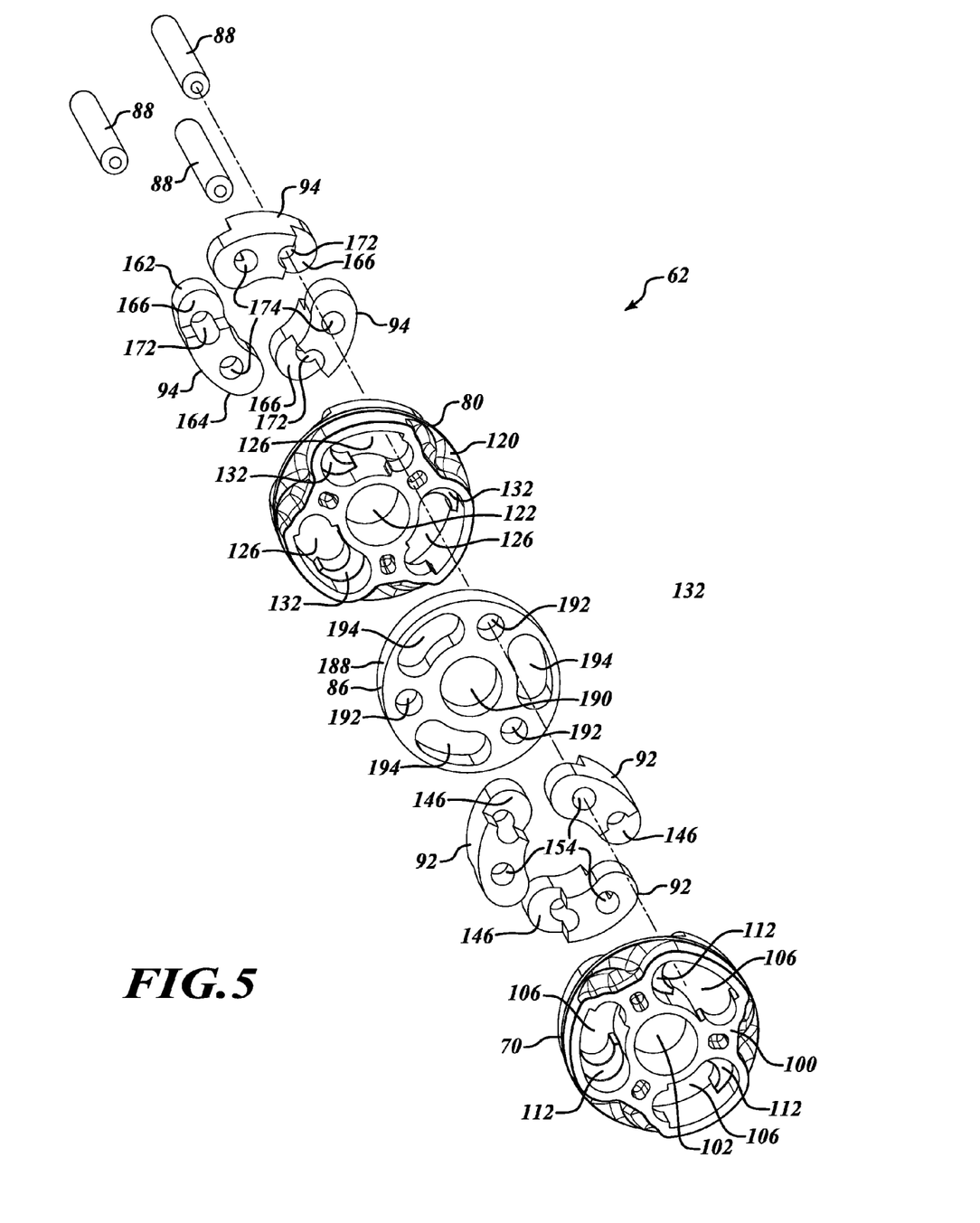
FIG. 5 is a rear perspective view of the coupling assembly of FIG. 4.
Figure 6:
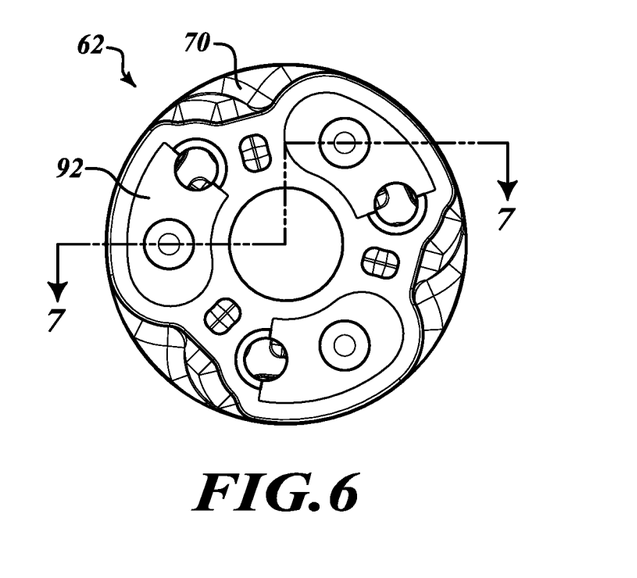
FIG. 6 is an end view of the coupling assembly of FIG. 2.
Figure 7:
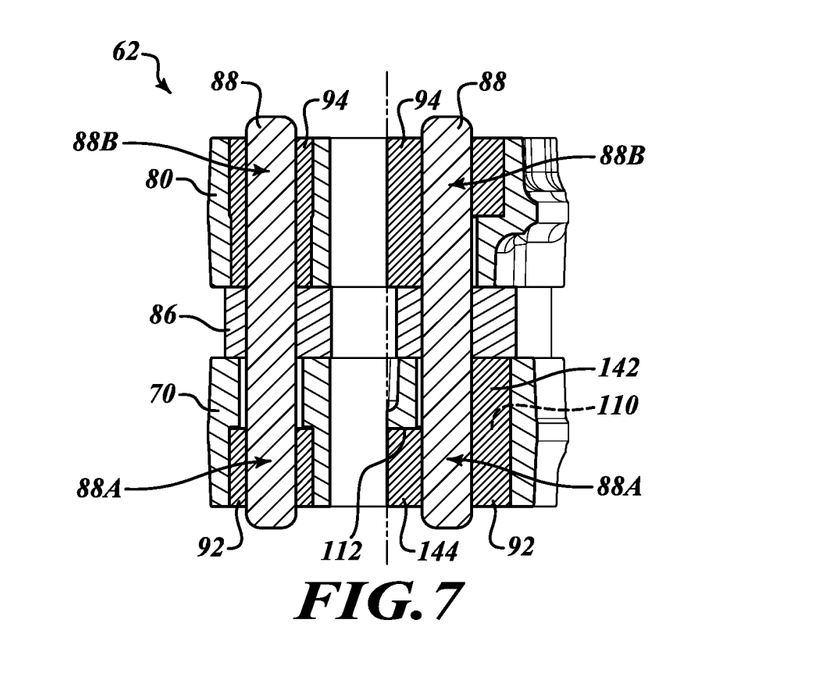
FIG. 7 is a cross-sectional view of the coupling assembly taken along lines 7-7 of FIG. 6.

With particular reference now to FIGS. 4 and 5, the first coupling 70 will be described. The first coupling 70 generally includes a first coupling body 100 that defines a central bore 102 and a plurality of openings 106. The first coupling body 100 can further include a first series of steps 110 (FIG. 4) and a second series of steps 112 (FIG. 5). The first series of steps 110 can be radially offset from the second series of steps 112. In the example shown, each step of the series of first and second steps 110 and 112 can be parallel to each other and perpendicular to an axis of the coupling assembly 62. In the configuration illustrated, the first series of steps 110 can face in one direction while the second series of steps 112 can face in an opposite direction. The first coupling 70 can be formed of any suitable lightweight durable material such as, but not limited to, PEEK or glass-filled molded nylon.

The second coupling 80 can be constructed similarly to the first coupling 70. In one configuration the first and second couplings 70 and 80 can be identical. The second coupling 80 generally includes a second coupling body 120 that defines a central bore 122 and a plurality of openings 126. The second coupling body 120 can further include a first series of steps 130 (FIG. 4) and a second series of steps 132 (FIG. 5). The first series of steps 130 can be radially offset from the second series of steps 132. In the example shown, each step of the series of first and second steps 130 and 132 can be parallel to each other and perpendicular to an axis of the coupling assembly 62. In the configuration illustrated, the first series of steps 130 can face in one direction while the second series of steps 132 can face in an opposite direction. The second coupling 80 can be formed of any suitable lightweight durable material such as, but not limited to, PEEK or glass-filled molded nylon.

With continued reference to FIGS. 4 and 5, the first inserts 92 will be further described. In general, the first inserts 92 can be formed of elastomeric material. In one configuration, the first inserts 92 can be formed of rubber material that is molded to the first coupling body 100 at the first plurality of openings 106. Each of the first inserts 92 can be identical. Each first insert 92 has an arcuately shaped insert body 140 that includes a first wing portion 142 and a second wing portion 144. The first wing portion 142 has a first seat 146 (FIG. 5). The second wing portion 144 has a second seat 148 FIG. 4). The first inserts 92 can define first apertures 152 (FIG. 4) defined in the first wing portions 142 and second apertures 154 (FIG. 5) defined in the second wing portions 144.

In the example shown, the first apertures 152 are defined by a full circumferential surface through the first wing portion 142 and a partial circumferential surface through the second wing portion 148 (see also FIG. 5). Similarly, the second apertures 154 are defined by a full circumferential surface through the second wing portion 144 and a partial circumferential surface through the first wing portion 142.

With continued reference to FIGS. 4 and 5, the second inserts 94 will be further described. In general, the second inserts 94 can be formed of elastomeric material. In one configuration, the second inserts 94 can be formed of rubber material that is molded to the second coupling body 120 at the first plurality of openings 126. Each of the second inserts 94 can be identical. Each second insert 94 has an arcuately shaped insert body 160 that includes a first wing portion 162 and a second wing portion 164. The first wing portion 162 has a first seat 166 (FIG. 5). The second wing portion 164 has a second seat 168. The second inserts 94 can define first apertures 172 (FIG. 4) defined in the first wing portions 162 and second apertures 174 (FIG. 5) defined in the second wing portions 164.

In the example shown, the first apertures 172 are defined by a full circumferential surface through the first wing portion 162 and a partial circumferential surface through the second wing portion 168 (see also FIG. 5). Similarly, the second apertures 174 are defined by a full circumferential surface through the second wing portion 164 and a partial circumferential surface through the first wing portion 162.

As will become appreciated from the following discussion, the coupler pins 88 can bear against the surfaces defined by the first and second apertures 152 and 154 of the first inserts 92 as well as the surfaces defined by the first and second apertures 172 and 174 of the second inserts 94. The first and second inserts 92 and 94 can be formed of elastomeric material such as ethylene propylene diene monomer (EPDM) rubber. The first and second inserts 92 and 94 can be a synthetic elastomer (elastic polymer). The first and second inserts 92 and 94 can be molded or poured as an amorphous liquid. The elastomeric material of the first and second inserts 92 and 94 can absorb the rotational energy from the coupler pins 88 during operation of the rotary blower 26 to provide dampening.

The central hub 86 includes a central hub body 188 having central bore 190, a series of alternately arranged bores 192 and arcuate passages 194. The central hub 86 can be formed of steel. The bores 192 are configured to receive the coupler pins 88. The arcuate passages 194 can be configured to accommodate hub pins associated with the first and second hubs 64 and 66 (see FIGS. 2 and 4).

Figure 8:
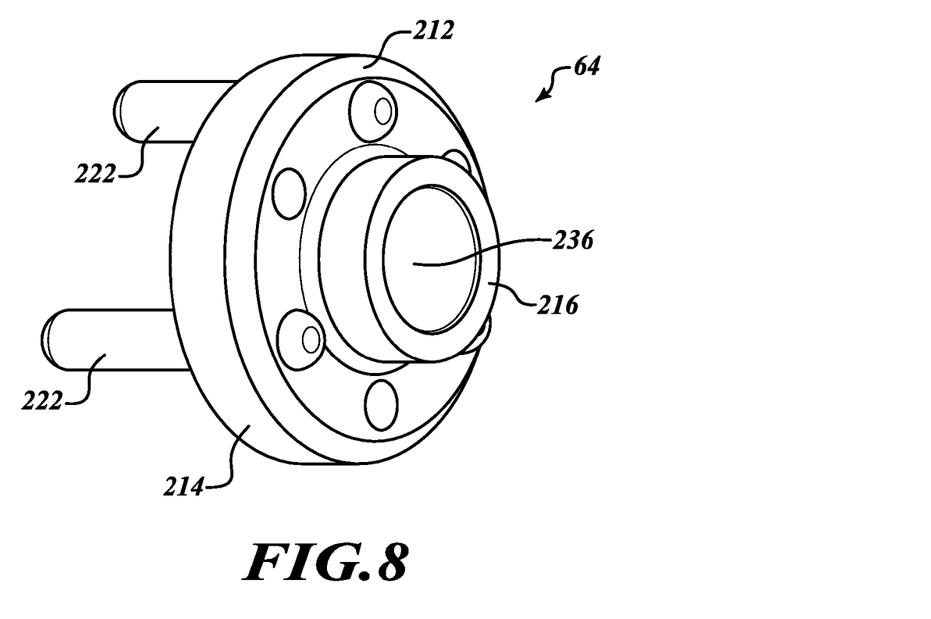
FIG. 8 is a front perspective view of a first hub used to couple the coupling assembly to the input shaft according to one example of the present disclosure.
Figure 9:
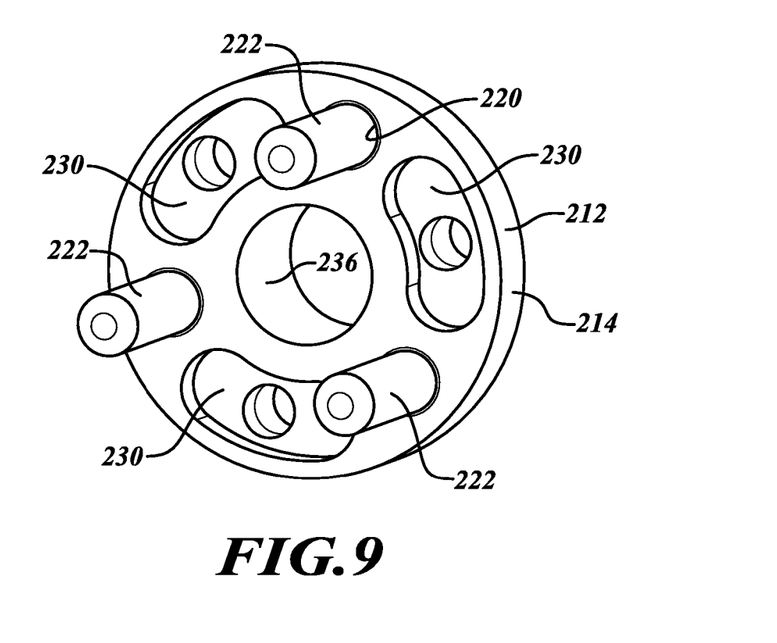
FIG. 9 is a rear perspective view of the first hub of FIG. 8.

With reference now to FIGS. 2, 8 and 9, the first hub 64 will be described in greater detail. In general, the first hub 64 is used to couple the input shaft 54 to the coupling assembly 62. The second hub 66 is used to couple the rotor shaft 60 to the coupling assembly 62. The first hub 64 and the second hub 66 are constructed similarly. In this regard, only the first hub 64 is shown in FIGS. 8 and 9 and will be described. The first hub 64 can generally include a first hub body 212 including a central hub body 214 and a distal protruding section 216. The central hub body 214 includes a plurality of apertures 220 that receive hub pins 222 therein. A series of counter-recesses 230 are formed in the central hub body 214. The counter-recesses are formed in an arcuate shape. The counter-recesses 230 are arranged to accommodate a terminal end portion of the coupler pins 88 (FIG. 2). The arcuate shape can accommodate relative rotational movement of the coupler pins 88 in the counter-recesses 230. A central bore 236 is formed through the first hub 212. In one example, the input shaft 54 can be press-fit into the central bore 236.

In an assembled position, the hub pins 222 extending from the second hub 66 can extend through the respective openings 106 of the first coupling 70 and into the arcuate passages 194 of the central hub 86. Similarly, the hub pins 222 extending from the first hub 64 can extend through the respective openings 126 of the second coupling 80 and into the arcuate passages 194 of the central hub 86. While extending through the first openings 106 of the first coupling 70, the hub pins 222 extend through the first apertures 152 of the first inserts 92. First portions 88A of the coupler pins 88 extend through the second apertures 154 of the first inserts 92. While extending through the second openings 126 of the second coupling 80, the hub pins 222 extend through the first apertures 172 of the second inserts 94. Second portions 88B of the coupler pins 88 extend through the second apertures 174 of the second inserts 94.

During operation, the coupling assembly 62 provides dampening (torsional and axial) between the input shaft 54 to the rotor shaft 60. In this regard, the first inserts 92 provide parallel springs for the first hub 70 as they absorb rotational energy from the coupler pins 88. Similarly, the second inserts 94 provide parallel springs for the second hub 72 as they absorb rotational energy from the coupler pins 88. The first hub 70 and the second hub 72 cooperate to provide series damping along the coupler pins 88 on opposite sides of the central hub 86. In this regard, the coupling assembly 62 provides both parallel and series damping to provide misalignment degree of freedom, torsional rate reduction and torsional and axial dampening.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A coupling assembly arranged between an input shaft and a rotor shaft of a supercharger, the coupling assembly comprising:
    a first coupling mounted for concurrent rotation with the rotor shaft;
    a second coupling mounted for concurrent rotation with the input shaft;
    a central hub disposed between the first and second couplings, the central hub defining central hub bores therein;
    a plurality of coupler pins received in the central hub bores;
    a first hub that is configured to couple between the input shaft and the first coupling, the first hub having a first plurality of hub pins extending therefrom;
    a second hub that is configured to couple between the rotor shaft and the second coupling, the second hub having a second plurality of hub pins extending therefrom;
    a first plurality of elastomeric inserts configured on the first coupling, the first plurality of elastomeric inserts receiving first portions of the plurality of coupler pins; and
    a second plurality of elastomeric inserts configured on the second coupling, the second plurality of elastomeric inserts receiving second portions of the plurality of coupler pins;
    wherein the first and second elastomeric inserts provide dampening between (i) the first coupling and the central hub; (ii) the second coupling and the central hub; (iii) the first hub and the first coupling, and (iv) the second hub and the second coupling.

2. The coupling assembly of claim 1,
    wherein the central hub further defines arcuate passages formed therein configured to at least partially receive the first hub pins and the second hub pins.

3. A coupling assembly arranged between an input shaft and a rotor shaft of a supercharger, the coupling assembly comprising:
    a first coupling having a first plurality of openings therein, the first plurality of openings are defined by a first series of steps and a second series of steps and wherein the first series of steps are radially offset from the second series of steps and are parallel to each other, the first coupling mounted for concurrent rotation with the input rotor shaft;
    a second coupling having a second plurality of openings therein, the second coupling mounted for concurrent rotation with the input shaft;
    a plurality of coupler pins;

a first plurality of elastomeric inserts received by the first plurality of openings, the first plurality of elastomeric inserts receiving first portions of the plurality of coupler pins wherein the first inserts each have an arcuately shaped insert body including a first wing portion and a second wing portion, wherein the first wing portion nests against a step of the first series of steps and wherein the second wing portion nests against a step of the second series of steps; and a second plurality of elastomeric inserts received by the second plurality of openings, the second plurality of elastomeric inserts receiving second portions of the plurality of coupler pins;

wherein the first and second elastomeric inserts provide dampening between (i) the first coupling and the input shaft and (ii) the second coupling and the rotor shaft.

4. The coupling assembly of claim 3, further comprising a central hub disposed intermediate the first and second couplings, the central hub defining central hub bores therein that cooperatively receive the plurality of coupler pins.

5. The coupling assembly of claim 4, further comprising:
a first hub that is configured to couple between the input shaft and the first coupling, the first hub having a first plurality of hub pins extending therefrom; and
a second hub that is configured to couple between the rotor shaft and the second coupling, the second hub having a second plurality of hub pins extending therefrom.

6. The coupling assembly of claim 5 wherein the central hub further defines arcuate passages formed therein configured to at least partially receive the first hub pins and the second hub pins.

7. The coupling assembly of claim 6 wherein each insert of the first plurality of elastomeric inserts defines a first aperture and a second aperture, wherein the first aperture receives a hub pin and the second aperture receives a coupler pin.

8. The coupling assembly of claim 3 wherein the first plurality of elastomeric inserts are molded to the first coupling and wherein the second plurality of elastomeric inserts are molded to the second coupling.

9. A coupling assembly arranged between an input shaft and a rotor shaft of a supercharger, the coupling assembly comprising:
a first coupling having a first plurality of openings therein, the first plurality of openings defined by a first series of steps and a second series of steps, the first coupling mounted for concurrent rotation with the rotor shaft;
a second coupling having a second plurality of openings therein, the second coupling mounted for concurrent rotation with the input shaft;
a central hub disposed intermediate the first and second couplings, the central hub defining central hub bores therein;
a plurality of coupler pins received in the central hub bores;
a first plurality of elastomeric inserts received by the first plurality of openings, the first plurality of elastomeric inserts receiving first portions of the plurality of coupler pins wherein the first inserts each have an arcuately shaped insert body including a first wing portion and a second wing portion, wherein the first wing portion nests against a step of the first series of steps and wherein the second wing portion nests against a step of the second series of steps; and
a second plurality of elastomeric inserts received by the second plurality of openings, the second plurality of elastomeric inserts receiving second portions of the plurality of coupler pins;
wherein the first and second elastomeric inserts provide dampening between (i) the first coupling and the central hub and (ii) the second coupling and the central hub.

10. The coupling assembly of claim 9 wherein each of the first plurality of elastomeric inserts is molded to the first coupling.

11. The coupling assembly of claim 10 wherein each of the second plurality of elastomeric inserts is molded to the second coupling.

12. The coupling assembly of claim 9 wherein the first series of steps are radially offset from the second series of steps and are parallel to each other.

13. The coupling assembly of claim 9, further comprising:
a first hub that is configured to couple between the input shaft and the first coupling, the first hub having a first plurality of hub pins extending therefrom; and
a second hub that is configured to couple between the rotor shaft and the second coupling, the second hub having a second plurality of hub pins extending therefrom.

14. The coupling assembly of claim 13 wherein the central hub further defines arcuate passages formed therein configured to at least partially receive the first hub pins and the second hub pins.

15. The coupling assembly of claim 14 wherein each insert of the first plurality of elastomeric inserts defines a first aperture and a second aperture, wherein the first aperture receives a hub pin and the second aperture receives a coupler pin.

16. The coupling assembly of claim 15 wherein each insert of the second plurality of elastomeric inserts defines a first aperture and a second aperture, wherein the first aperture receives a hub pin and the second aperture receives a coupler pin.

* * * * *